United States Patent [19]

Chino et al.

[11] Patent Number: 4,831,961
[45] Date of Patent: May 23, 1989

[54] MAGNETIC LIQUID APPLICATION METHOD AND APPARATUS

[75] Inventors: Naoyoshi Chino; Yasunori Tanaka; Kenichi Fukumura; Yasuhito Hiraki, all of Kanagawa, Japan

[73] Assignee: Fuji Photo Film Co., Ltd., Kanagawa, Japan

[21] Appl. No.: 111,477

[22] Filed: Oct. 16, 1987

Related U.S. Application Data

[62] Division of Ser. No. 899,357, Aug. 22, 1986, Pat. No. 4,729,858.

[30] Foreign Application Priority Data

Oct. 18, 1985 [JP] Japan ................................. 60-231089

[51] Int. Cl.$^4$ ................................................ B05C 3/00
[52] U.S. Cl. ..................................... 118/410; 137/563
[58] Field of Search .................... 118/410, 411, 25, 14; 137/563

[56] References Cited

U.S. PATENT DOCUMENTS

| | | | |
|---|---|---|---|
| 1,258,322 | 3/1918 | Doellinger | 118/14 |
| 2,650,003 | 8/1953 | Coleman | 118/410 X |
| 3,227,136 | 1/1966 | Bartlett et al. | 118/410 |
| 3,519,015 | 7/1970 | Bartel | 137/563 |

FOREIGN PATENT DOCUMENTS 925883 5/1963 United Kingdom ............... 118/410

Primary Examiner—Shrive Beck
Assistant Examiner—Alain Bashore
Attorney, Agent, or Firm—Sughrue, Mion, Zinn, Macpeak and Seas

[57] ABSTRACT

A method and apparatus for applying a magnetic liquid to a moving web by using an extruder head for ejecting the magnetic liquid onto the web. A by-pass line for returning the liquid to a feed source through a change-over valve is provided immediately upstream to the extruder head. The liquid is supplied to the by-pass line through the valve after the extruder head is filled with the liquid before the first starting of the application or the resumption thereof. The position of the valve is shifted at the time of the first starting of the application or the resumption thereof so as to supply the liquid to the head to perform the application.

2 Claims, 1 Drawing Sheet

MAGNETIC LIQUID APPLICATION METHOD AND APPARATUS

This is a division of application Ser. No. 899,357, filed Aug. 22, 1986, now U.S. Pat. No. 4,729,858.

BACKGROUND OF THE INVENTION

The present invention relates to a method of applying a magnetic liquid to a long wide web, and more particularly relates to an improved method in starting the application of a magnetic liquid to a moving web by an extrusion application device or in resuming the application after the passing of the joint of two webs across an extruder head.

To conventionally manufacture a magnetic recording medium or the like, an agent which is to become a magnetic layer, a protective layer, a backing layer or the like is continuously and uniformly applied to a long wide web made of a polyethylene terephthalate or the like and having a thickness of several microns to several hundred microns, a width of several hundred millimeters to several thousand meters. The applied agent is dried, and the assembly of the dried agent and the web is wound around a reeling shaft. The assembly is cut into a plurality of slender pieces, each having a width equal to that of the magnetic recording medium or the like. Each slender piece is cut into segments, each having a length equal to that of the medium or the like, and each segment is wound around a spool or the like.

Various methods have been used in the past to apply agent to a web including roller application, gravure application, roller application-brass doctor, extrusion application, slide bead application and so forth. The method of extrusion application and the method of slide bead application have recently been used more widely than the other methods.

Methods of extrusion application have been disclosed in Japanese Patent Publication Gazettes Nos. 47-45523 and 54-7306, U.S. Pat. No. 3,227,136 and Japanese Laid-Open Gazette No. 58-189069. Japanese Patent Publication No. 58-39588 discloses extrusion coating and thereafter doctoring the coating to obtain predetermined coating thickness. A method of slide bead application type has been disclosed in Japanese Patent Laid-Open Gazette No. 48-98803. In these methods, a liquid in which a magnetic substance is dispersed is supplied to an extruder head by a constant quantity pump and then all of the liquid is applied to a web. The quantity V (cc./min.) of the supplied liquid is normally determined as follows:

$$V = a \cdot s \cdot w$$

In the above formula, a denotes a quantity (cc./m$^2$) necessary to be applied to the web, s denotes the speed (m/min.) of the application, and w denotes the width (m) of the application. If the quantity V of the liquid supplied by the pump fluctuates, the quantity a applied to the web fluctuates too. In that case, the necessary quantity a is not maintained, so that a desired product is not made. When the applied liquid is scraped off by a doctor blade located downstream of the extruder head with respect to the direction of the movement of the web, the pressure on the doctor blade fluctuates because of the fluctuations in the quantity of the liquid applied by the extruder head, so that a steplike irregularity or the like is caused as to the thickness of the film of the applied liquid. For these reasons, the applied quantity of the liquid should be as constant as possible.

The fluctuation in the applied quantity of the liquid which produces an adverse effect as described above, is most likely to occur in the following cases:

(1) When the application of the liquid to the web is started: For instance, at the first time the application of liquid is stated, or at the time of resuming the application after its stoppage due to trouble or the like.

(2) When the application of the liquid is resumed after the joint of two webs has passed across the extruder head. (During passage of the joint across the extruder head, the extruder head is sufficiently separated from the webs so that the webs do not contact the extruder head.)

The method of passing the joint of two webs across the extruder head is now described. The length of each web is usually several hundred meters to several thousand meters. To continuously apply the liquid to plural webs, these webs are sequentially conjoined to each other as one web is sent after the other. To join the webs, the webs are overlaid on each other or butted to each other so as to be conjoined together by a two-sided-adhesive tape or the like. A method of butting webs to each other and conjoining them together has been disclosed in the Japanese Patent Laid-Open Gazette No. 55-142565. Since the joint of the webs has different levels due to their overlay, or to the presence of the tape or the like, the joint comes into contact with the extruder head. In order to avoid this contact, one of the procedures described below is usually taken.

(i) The gap between the web and the extruder head is made larger by several ten microns to several hundred microns at the time of passing the joint across the extruder head as compared to the gap which exists at the time of normal application.

(ii) The extruder head is thoroughly separated from the webs, and the joint of the webs is then passed across the extruder head. After that, the application is resumed.

When the application of liquid is started for the first time or is resumed after the passing of the joint of the webs, one of two procedures described below is usually taken in order to supply the liquid to the extruder head.

(a) The liquid feed pump is stopped. The liquid pump is started to supply liquid simultaneously with the start or with the resumption of the application of the liquid to the web.

(b) The pump is started before the liquid is applied to the web, so that the liquid flows out of the extruder head before it is applied to the web.

When following procedure (b), the top of the extruder head and vicinity thereof become contaminated because the liquid flows out of the extruder head. Since the magnetic liquid is made of an organic solvent, the magnetic liquid on the top of the extruder head dries quickly so that the dried matter clings as an extraneous substance thereto. This results in making a streak or the like on the surface of the film of the applied liquid. For that reason, it is the procedure (a) that is desirable to start or resume the application. However, the pump cannot be driven at a desired rotational frequency the instant it is started. Therefore, it takes some time for the supplied liquid to reach a prescribed flow rate. For that reason, the liquid applied to the web cannot reach a required quantity as soon as the application of liquid is started or resumed. Before the applied liquid reaches the required quantity at the time of the starting or resumption, the corresponding portion of the product made by the application becomes defective. This leads to a poor yield as to the product. If the number of times that web joints are passed across the extruder head is large, the number of defective portions of the product is also large.

SUMMARY OF THE INVENTION

It is an object of the present invention to provide a mangetic liquid application method in which the top of an extruder head and the vicinity thereof are not contaminated.

Another object is to provide such a method wherein a magnetic liquid is supplied in a prescribed quantity as soon as the application of the liquid is started or resumed.

A further object is to provide such a method wherein a streak is not made on the film of the applied liquid.

A still further object is to provide such a method wherein the number of defective portions of a product is minimized.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a method for applying a magnetic liquid to a moving web by an apparatus having an extruder head for ejecting the magnetic liquid onto the web, a feed source for holding a supply of the magnetic liquid and a feeder line connecting the extruder head with the feed source, comprising: providing a by-pass line that connects with the feeder line immediately upstream of the extruder head and with the feed source for returning liquid from the liquid to the feed source, providing a changeover valve at the juncture of the feeder line and by-pass line to control the flow of liquid so that liquid flows either to the feeder line or to the by-pass line, positioning the changeover valve so that liquid flows to the extruder head before the first starting of the application of liquid to the web; supplying the liquid to the by-pass line through the changeover valve after the extruder head is filled with the liquid before the starting of the application of the liquid to the web or before the resumption thereof; and switching the position of the valve at the time of the first starting of the application of the resumption thereof so as to supply the liquid to the head to perform the application.

In another aspect of the present invention, an apparatus is provided to carry out the above method.

It is preferable that the pressure for supplying the magnetic liquid to the by-pass line is made equal to that of the liquid being applied to the web, according to the present invention.

According to the present invention, the items described below are implemented.

(1) The changeover valve is provided immediately upstream of the extruder head. The by-pass line for returning the magnetic liquid to its feed source is provided in addition to a line for supplying the magnetic liquid to the extruder head.

(2) A prescribed quantity of the magnetic liquid is supplied to the by-pass line through the changeover valve after the extruder head is filled with the magnetic liquid before the first starting of the application of the liquid to the web or the resumption thereof.

Since the above-described items (1) and (2) are implemented, the prescribed quantity of the magnetic liquid is instantaneously supplied to the extruder head when the changeover valve is shifted into the applying position simultaneously with the starting of the application of the liquid to the web or the resumption thereof. For that reason, the flow rate of the magnetic liquid is kept from fluctuating at the time of restarting of the pump. However, the prescribed quantity of the magnetic liquid cannot necessarily be applied immediately, only by the items (1) and (2). This failure to apply the prescribed quantity of the magnetic liquid occurs when the pressure (which is equal to the sum of the pressure loss in supplying the liquid to the application head and other pressure) for supplying the liquid to the extruder head is higher than that for supplying the liquid to the by-pass line. At that time, even if the prescribed quantity of the liquid is supplied to the extruder head, the prescribed quantity of the liquid does not instantaneously flow out of the extruder head. For that reason, it is preferable to implement another item described below.

(3) The pressure for supplying the magnetic liquid to the by-pass line is made essentially equal to that for supplying the magnetic liquid during the application thereof to the web.

In the magnetic liquid application method according to the present invention, the magnetic liquid can be applied at a prescribed quantitative rate to the moving web within a short time from the start of the application of the liquid to the web or within a short time after the application is resumed after the passing of the joint of webs across the extruder head. This results in improving the yield of the product made by the application.

It is to be understood that both the foregoing general description and the following detailed description are exemplary and explanatory, but are not restrictive of the invention.

DETAILED DESCRIPTION OF EXEMPLARY EMBODIMENTS

The present invention is described in detail with reference to the drawings.

Figure 1:
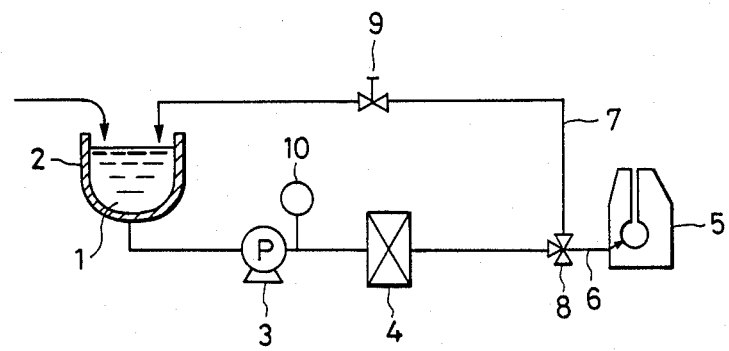
FIG. 1 shows an explanatory view of an embodiment of the present invention.

FIG. 1 shows a magnetic liquid application method which is an embodiment of the present invention. A magnetic liquid 1 to be applied is sent from a preparatory process to a tank 2 wherein the liquid is stored. Magnetic liquid 1 is supplied in a prescribed quantity from tank 2 to the vicinity of an extruder head 5 through a filter 4 by a pump 3. A line 6 for supplying the liquid to extruder head 5 connects filter 4 with extruder head 5. A by-pass line 7 connects with feeder line 6 immediately upstream of the extruder head and with tank 2. A valve 8 for switching the flow of liquid from tank 2 either to line 6 for supplying the liquid to the extruder head 5 or to by-pass line 7 for returning the liquid to the tank 2 is provided immediately upstream of extruder head 5 at the juncture of line 6 with by-pass line 7. When liquid 1 is not required to be supplied to extruder head 5, namely, when the application of the liquid is not performed or is about to be started, valve 8 is put in a first position to supply the prescribed quantity of the liquid only to by-pass line 7. To start the application of liquid to the web, valve 8 is shifted to a second position to supply liquid 1 only to extruder head 5 through line 6. For that reason, pump 3 can be always kept rotating at a prescribed speed. By-pass line 7 is provided with a valve 9 for applying a prescribed pressure to by-pass line 7.

Figure 2:
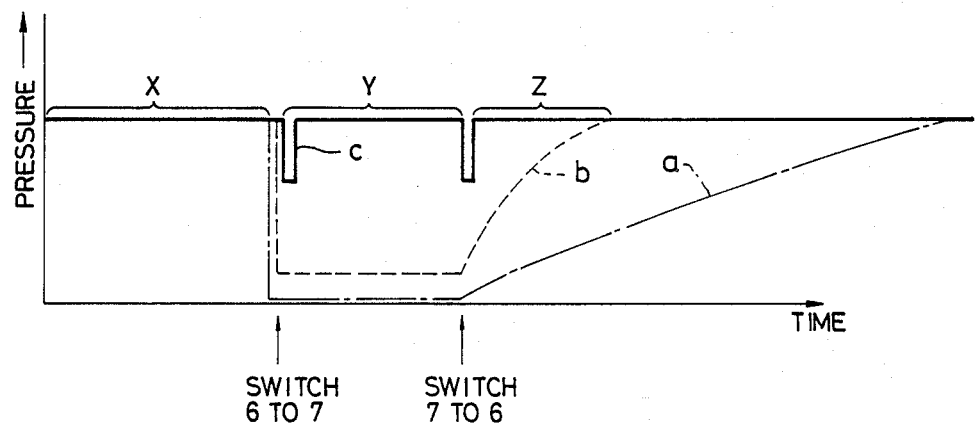
FIG. 2 shows a diagram indicating the pressure at the time of starting of application.

FIG. 2 shows the reading of a pressure gauge 10 provided downstream of pump 3. The chain line (a) in FIG. 2 indicates the case where the pump is started simultaneously with the starting of the application of liquid to the web in accordance with a prior art technique. The dotted line (b) in FIG. 2 indicates the case where the pump is started before the resumption of the application so as to cause the liquid 1 to flow through by-pass line 7, according to the present invention. The full line (c) in FIG. 2 indicates the case where the prescribed pressure is applied by valve 9 in by-pass line 7, according to a preferred embodiment of the present invention. Coating is carried out in zones X and Z and liquid is not supplied to the coating head in zone Y in FIG. 2. It will be understood from FIG. 2 that liquid 1 can be supplied at a prescribed flow rate within a much shorter time if the liquid is caused to be flowing beforehand than if the pump is started simultaneously with the starting of the application of the liquid to the web. Furthermore, it will be understood that the prescribed pressure is applied to by-pass line 7 beforehand.

Examples of the present invention are now described in detail.

Example

A magnetic liquid having a composition shown below is applied to a web.

Composition of magnetic liquid 100 parts of a cobalt-containing magnetic iron oxide ($S_{BET}$: 35 m$^2$/g)
10 parts of nitrocellulose
8 parts of a polyurethane resin (commercial product "Nipporan 2304" made by Nippon Polyurethane Co., Ltd.)
8 parts of a polysocyanate
2 parts of Cr$_2$O$_3$
2 parts of carbon black (average grain diameter: 20μ)
1 part of stearic acid
1 part of butyl stearate
300 parts of methyl ethyl ketone The length of the web, which passes along an extruder head throughout the period from the starting of the application of the liquid to the web to the time when the magnetic liquid is applied in a prescribed quantity to the web, is measured in a Case 1 in which a liquid feed pump is started simultaneously with the starting of the application, a Case 2 in which the liquid is supplied to a by-pass line beforehand according to the present invention, and a Case 3 in which a prescribed pressure is applied to the by-pass line beforehand according to a preferred embodiment of the present invention. The speed of the application is 100 m/min. The supplied quantity of the magnetic liquid is 1.0 lit./min. The thickness of the dried film of the applied magnetic liquid is 4μ. The results of the measurement are shown in Table 1 below.

TABLE 1

| | Length of web having passed |
|---|---|
| Case 1 | 25 m |
| Case 2 | 12 m |
| Case 3 | 2 m |

It will be understood that the above description of the present invention is susceptible to various modifications, changes and adaptations, and the same are intended to be comprehended within the meaning and range of equivalents of the appended claims.

What is claimed is:

1. An apparatus for applying a magnetic liquid to a moving web comprising: an extruder head for ejecting the magnetic liquid onto the web, a feed source for holding the magnetic liquid, a feeder line connecting the extruder head with the feed source, a by-pass line connecting with the feeder line immediately upstream of the extruder head and with the feed source for returning liquid from the feeder line to the feed source, adjustable pressure control means provided in the by-pass line, and a changeover valve at the juncture of the feeder line and by-pass line to control the flow of liquid so that liquid flows either to the feeder line or to the by-pass line.

2. The apparatus according to claim 1, wherein the adjustable pressure control means provided in the by-pass line is a valve to control the pressure in the by-pass line so that it is substantially equal to that of the liquid being applied to the web.

* * * * *